United States Patent [19]

Thayer, III et al.

[11] 4,360,923
[45] Nov. 23, 1982

[54] REAGENT TAILORING FOR A CHEMICAL GAS LASER TO OBTAIN UNIFORM INITIAL CHEMICAL REACTION RATE

[75] Inventors: William J. Thayer, III; Carmine J. Artura, both of Kent, Wash.

[73] Assignee: The Boeing Company, Seattle, Wash.

[21] Appl. No.: 99,334

[22] Filed: Dec. 3, 1979

[51] Int. Cl.$^3$ .............................................. H01S 3/05
[52] U.S. Cl. .................................................... 372/89
[58] Field of Search ................... 331/94.5 G, 94.5 PE, 331/94.5 C, 94.5 D

[56] References Cited

U.S. PATENT DOCUMENTS 3,688,215 8/1972 Spencer et al. .............. 331/94.5 PE
4,048,586 9/1977 Witte et al. ..................... 331/94.5 D

OTHER PUBLICATIONS

"A Recirculating, Self-Contained DF/HF Pulsed Laser", by Fradin et al.; *IEEE Jour. Quant. Elect.*, vol. QE-11, No. 8, part 1, (Aug. 1975); pp. 631-633.
"Initial Performance of a CW Chemical Laser", by Spencer et al., *Opto-Electronics* 2 (1970), pp. 155-160, No. 3.

*Primary Examiner*—William L. Sikes
*Assistant Examiner*—Léon Scott, Jr.
*Attorney, Agent, or Firm*—Christensen, O'Connor, Johnson & Kindness

[57] ABSTRACT

A method and apparatus for tailoring the concentration profiles of reactant and diluent species in the gas stream of a pulsed chemical laser provide a substantially uniform initial chemical reaction rate and index of refraction across the laser cavity. In the preferred embodiment, a gas stream is composed of the two reactant species, molecular hydrogen (or deuterium) and molecular fluorine, diluent species argon and helium, and a trace of oxygen as a preinitiation inhibitor. A substantially uniform initial chemical reaction rate within the laser cavity is obtained by tailoring the concentration profile of the fluorine across the cavity to compensate for the variation in absorption of UV initiation radiation across the cavity along the axis of initiation. The index of refraction of the gas mixture is kept constant within the cavity by varying the concentration of diluent gases to compensate for the variation in the index of refraction that would otherwise result from the tailoring of the fluorine concentration profile. A mathematical model of UV radiation absorption in the laser cavity is developed on the basis of the specific geometry of the laser cavity and its associated source of UV initiation radiation. A radiation absorption analysis is then performed to define the fluorine concentration profile that provides the desired degree of uniformity of the initial chemical reaction rate. An injector/mixer manifold provides a gas stream having the desired reactant gas concentration profile, as well as a diluent gas concentration profile which provides a uniform index of refraction across the reagent stream.

15 Claims, 4 Drawing Figures

Fig. 1
PRIOR ART CHEMICAL GAS LASER

Fig. 2

REAGENT TAILORING FOR A CHEMICAL GAS LASER TO OBTAIN UNIFORM INITIAL CHEMICAL REACTION RATE

BACKGROUND OF THE INVENTION

The invention described herein may be manufactured and used by or for the government of the United States of America for governmental purposes without the payment of any royalty thereon or therefor.

The present invention relates generally to lasers, and more particularly to pulsed chemical gas lasers.

As with all lasers, conventional gas lasers generally include a laser cavity having a 100% feedback mirror at one end and a partial feedback mirror at the opposite end. Such mirrors define an optical axis extending through the cavity in a direction perpendicular to each mirror. A gaseous medium is contained in the cavity. The gas molecules in the cavity have quantum energy levels which define allowable rotational, vibrational and electronic energy states for the molecules. In the absence of external stimulation, most of the gas molecules subsist in the lower energy states. Due to random energy transfer effects, however, a small fraction of the molecule population will normally be in higher energy levels at any given moment.

When a gas molecule undergoes a decay transition from a high energy state to a low energy state, energy is released in the form of a photon of electromagnetic radiation. The frequency of the radiation emitted from the molecule depends on the difference in energy between the two energy states. Conversely, a gas molecule may undergo an excitation transition from a low energy state to a high energy state by absorption of energy imparted to the molecule by an absorbed photon or by other forms of excitation. Although by definition the lower energy state is the more stable state to which an excited molecule normally tends to return, a molecule, once excited to a high energy state, may remain in a metastable excited state for a relatively long period of time. Such an excited molecule may eventually undergo a spontaneous decay transition to a lower energy state, giving off a photon in the process. Alternatively, such an excited molecule may be stimulated to undergo decay to a lower energy state by interaction with other photons or by other types of stimulation. Emission of photons by this latter type of decay is termed stimulated emission.

In the operation of a conventional gas laser, an external source of energy is applied to excite the gas molecules to a high energy state. When a majority of the gas molecule population is excited to the high energy state, a situation referred to as a population inversion is created. Upon forming a population inversion, discharge of the laser may be initiated either by spontaneous decay of some of the excited molecules or by stimulated decay caused by irradiation of the excited gas. In either case, during discharge of the laser some of the photons emitted by the first molecules to decay are emitted in a direction parallel to the optical axis of the laser cavity. Since one end of the cavity is fully mirrored and the other end is partially mirrored, these photons, on the average, undergo multiple reflections between the two mirrored surfaces before they finally pass through the partial feedback mirror at the emission end of the cavity. During the course of their multiple internal reflections within the laser cavity, these photons cause stimulated emission of additional photons by interacting with the remaining excited gas molecules. In the process, each additional photon produced by stimulated emission is emitted in the same direction as that of the photons stimulating the emission, i.e., parallel to the optical axis of the laser. Consequently, the photons emitted by stimulated emission also undergo multiple reflections between the mirrored surfaces and continue the process. The net result is an avalanche decay process whereby substantially all of the excited gas molecules decay in a chain reaction in a very short period of time. In doing so, a significant portion of the energy released by the decay of the excited gas molecules is released in the form of photons emitted in a direction parallel to the optical axis of the laser. These photons all leave the laser cavity through the partially mirrored surface within a few reflection cycles to form the now well-known beam of highly coherent, monochromatic laser radiation.

In conventional lasers, the process of raising the gas molecules to an excited energy state to establish a population inversion is known in the art as pumping the laser. Various techniques are used to pump conventional gas lasers. For example, lasers may be pumped by discharging a high voltage electric current through the gas in the laser cavity. Collisions between the high voltage electrons and the gas molecules excite the gas molecules to high energy states. In another technique, ultraviolet (UV) radiation is directed into the laser cavity in a direction transverse to the optical axis of the laser to produce excited gas molecules.

In the simple gas laser thus far described, the net amount of energy emitted from the laser cavity in the form of laser radiation is always less than the net amount of energy put into the gas by pumping. In a continuous wave (CW) laser, for example, laser radiation is continuously emitted at a steady rate while the gas is continuously pumped with an external source of energy. Because of normal inefficiencies in energy transfer, this results in a relatively low power laser wherein the power output of the laser in the form of laser radiation is substantially less than the power input from the external source of energy.

In order to obtain short bursts of higher power laser radiation, pulsed lasers are commonly employed. In a pulsed gas laser, the gas is pumped over a relatively long period of time to create a substantial population inversion, whereupon rapid discharge of the laser, or "lasing", is stimulated as described above. Such a laser emits pulsed bursts of high power laser radiation. The power of each burst of laser radiation may be higher than the radiative input power of the external energy source used to pump the gas, althrough the integrated power output of the laser, averaged over many pulses, is necessarily still somewhat less than the corresponding integrated power input from the external energy source.

To achieve an even greater power output from a gas laser, chemical chain-reaction type gas lasers have been developed, referred to generally herein as chemical gas lasers. In a typical chemical gas laser, a mixture of chemically reactive gases is introduced into the laser cavity. The gases will normally be such as may coexist at least momentarily without spontaneously undergoing chemical reaction. The reactant gases are further chosen such as to produce an electronically or vibrationally excited product species upon undergoing an exothermic chemical reaction with each other. The excited product species is then capable of lasing. In this type of laser, an external energy source is generally used to initiate the chemical chain reaction in a manner similar to that by which a conventional nonchemical laser is pumped, i.e. by use of an electric discharge or by irradiation with ultraviolet radiation.

The primary advantage of the chemical chain-reaction type of laser is that a portion of the energy released by the exothermic chemical reaction is ultimately emitted in the form of laser radiation. This energy of chemical reaction is provided in addition to whatever energy is provided by the external energy source used to initiate the chemical reaction, thus making possible a laser having a significantly higher net power output than the net power input from the external energy source. Consequently, chemical gas lasers offer the prospect of higher efficiencies than have heretofore been possible with traditional gas lasers.

Since the reactant gases are consumed in the above-described chemical reaction, they must be replenished after each emission of laser radiation. This is accomplished by passing a stream of premixed reactant gases through the laser cavity in a direction perpendicular to the optical axis of the cavity. In this manner, the chemical reaction may be caused to occur within a reaction zone centered in the laser cavity as the gases flow through the cavity. Thus, upstream from the reaction zone the reactant gases are introduced and mixed together, and downstream from the reaction zone the spent chemical reaction products are carried away. Within the reaction zone itself, the chemical reaction is initiated and lasing occurs.

The flow of reactant gas is typically pulsed to separate the stream of gas into discrete pulses of reactant gas to prevent the chemical reaction from progressing upstream from the reaction zone of the laser cavity. The periodic initiation of the chemical reaction in the cavity is synchronized to coincide with the pulsing of the gas stream to thereby cause the chemical reaction to take place in each pulse of gas as it passes through the reaction zone of the cavity. The laser is typically pulsed at rates up to 100 pulses per second, the maximum pulse rate being limited primarily by the flow speed of the gas stream.

Currently being widely investigated are pulsed chemical gas lasers which utilize molecular fluorine ($F_2$) as one reactant gas species and either molecular hydrogen ($H_2$) or molecular deuterium ($D_2$) as the other reactant gas species. These are commonly referred to as HF and DF lasers, respectively. This type of laser is of interest because the chemical reaction between fluorine and either hydrogen or deuterium is highly exothermic and produces a vibrationally excited product species (HF or DF) which is capable of lasing, thus raising the prospect of developing very high power lasers. It is also found that the wavelength of the laser radiation is different for these two types of lasers, with the radiation produced by the DF laser being of somewhat greater interest for practical terrestrial laser applications because it undergoes relatively less attenuation during transmission through the atmosphere. Current research is focused, however, on the development of HF lasers to avoid the unnecessary expense of using deuterium during the developmental stage.

In the HF laser, an external source of energy, typically a source of ultraviolet radiation, initiates a chemical chain reaction in the reactant gas mixture by dissociating fluorine molecules to fluorine atoms according to the following reaction:

$$h\nu + F_2 \rightarrow F + F \tag{1}$$

where $h\nu$ represents a photon of ultraviolet radiation.

The free gaseous fluorine atoms react with molecular hydrogen in a chain reaction which proceeds according to the following reaction equations:

$$F + H_2 \rightarrow HF^* + H \tag{2}$$

$$H + F_2 \rightarrow HF^* + F \tag{3}$$

where HF* represents a vibrationally excited molecule of gaseous hydrogen fluoride. It will be seen from the above reactions that a single fluorine atom results in the production of two excited hydrogen fluoride molecules and another free fluorine atom which subsequently reacts with additional hydrogen molecules in a chain reaction which consumes substantially all of the molecular hydrogen and fluorine in the reaction zone. Thus, with only minimal initiation the chain reaction effectively pumps the laser to produce a population of excited HF molecules which subsequently decay by stimulated emission to produce a burst of laser light. Between each burst, the reactant gases in the reaction zone are replenished and the chain reaction is again initiated by the ultraviolet radiation.

High quality laser radiation is characterized as being highly monochromatic, highly coherent, and highly collimated in the direction of laser emission. It is recognized that in order to obtain a high quality laser beam it is necessary to have a uniform initial chemical reaction rate throughout the reaction zone of the laser cavity. However, it is also recognized that this condition is inherently difficult to achieve because of the configuration of the laser cavity. This follows because the ultraviolet radiation used to initiate the chemical reaction is radiated into the reaction zone from a source outside the reaction zone and is preferentially absorbed by the reactant gases nearest to the outer edges of the reaction zone where the ultraviolet radiation is most intense. Reactant gases near the center of the reaction zone receive less intense radiation, both because they are generally farther from the UV source and because the UV radiation reaching the center of the reaction zone is attenuated by absorption during its transmission through the reactant gases in the outer portions of the reaction zone. This gives rise to what is referred to herein as the nonuniformity problem.

Figure 1:
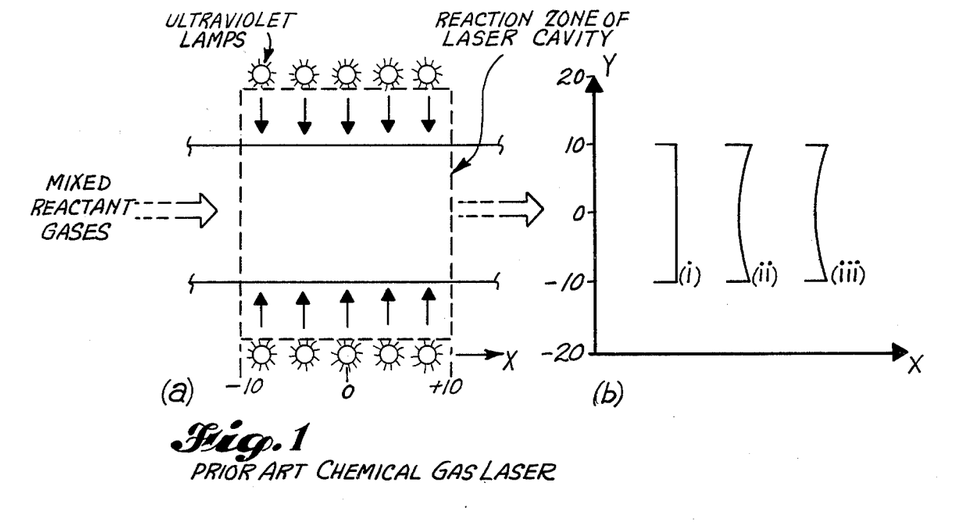
FIG. 1 shows (a), a schematic diagram of a chemical gas laser as known in the prior art, together with (b) an accompanying superimposable graphic illustration of the corresponding profiles of (i) the reactant gas concentration, (ii) the intensity of initiation radiation and (iii) the initial chemical reaction rate across the cavity.

For example, FIG. 1 illustrates in schematic form the effects of the nonuniformity problem on a conventional UV initiated, pulsed chemical gas laser. In FIG. 1(a) is illustrated a laser having banks of ultraviolet flash lamps on opposite sides of the laser cavity and having a stream of homogenous, mixed reactant gas flowing through the cavity. The optical axis of laser emission is perpendicular to the plane of the paper in this FIGURE. (In FIG. 1 and elsewhere herein, the optical axis of the laser is taken to be along the z-axis of a Cartesian coordinate system centered on the laser cavity. The direction of gas flow is taken to be along the x-axis, and the direction of ultraviolet irradiation is taken to be parallel to the y-axis.)

FIG. 1(b) is a graphical depiction of the profiles of (i) the reactant gas concentration, (ii) the UV intensity, and (iii) the initial chemical reaction rate, all taken in the direction of the y-axis across the reaction zone of the laser cavity shown in FIG. 1(a). These profiles are scaled in conformity with the reaction zone of FIG. 1(a) and are superimposable thereon. Referring to profile (i) of FIG. 1(b), the constant profile for the reactant gas concentration represents the profile for a conventional, well-mixed chemical gas laser. As shown in profile (ii), the UV intensity in such a laser decreases towards the center of the cavity. Accordingly, as shown in profile (iii), the initial chemical reaction rate likewise decreases towards the center of the cavity. It will also be noted that, for the particular laser configuration illustrated, wherein UV flash lamps are disposed on opposite sides of the cavity, the nonuniformities in the UV intensity and in the initial chemical reaction rate are symmetrically disposed about the center of the cavity.

The effects of the nonuniformities described are nonuniform levels of emission of laser radiation within the cavity and a distorted laser beam. In practice, it is found that even small inhomogeneities in the intensity of laser radiation generated within the cavity produce substantial distortions in the emitted laser beam. In particular, among the consequences of a nonuniform initial chemical reaction rate in the cavity is a nonuniform index of refraction within the cavity with accompanying refraction of radiation within the cavity and poor collimation of the emitted laser beam. In practice it is found that even very slight refraction of the laser beam within the reaction zone of the cavity substantially impairs the quality of the beam by causing it to rapidly diverge and dissipate upon leaving the laser cavity.

It is also found that the nonuniformity problem is particularly acute in high power lasers where there are larger laser cavities. Large laser cavities result in proportionately greater attenuation of the initiation radiation as it passes through the cavity, with correspondingly greater nonuniformities in the initial chemical reaction rate across the cavity.

Accordingly, it is a general object of the present invention to provide a chemical gas laser in which the initial rate of formation of excited gas species is uniform throughout the reaction zone of the laser cavity. More particularly, it is an object of the present invention to provide a chemical gas laser of the chemical chain reaction type wherein a uniform rate of initiation of a chemical reaction is obtained throughout the effective reaction zone of the laser cavity. It is a further object to accomplish the foregoing objects and also maintain a uniform index of refraction within the reaction zone of the laser cavity.

SUMMARY OF THE INVENTION

In accordance with the present invention, there is established a stream of a reactant gas flowing through a laser cavity wherein the concentration of the reactant gas within the stream is varied in a direction transverse to the direction of flow and transverse to the optical axis of the cavity in order to compensate for attenuation of incident initiation radiation in the gas stream. In other words, the concentration of the reactant gas is varied in a direction parallel to the direction of irradiation from a source of initiation radiation. Variation of the concentration of the reactant gas across the gas stream may be accomplished by using a plurality of gas nozzles to form the gas stream. By varying the flow rate of reactant gas from the various nozzles, it is found that the stream of reactant gas can be compositionally tailored to achieve a substantially uniform initial chemical reaction rate throughout the reaction zone of the cavity.

It is further found that the aforementioned uniform reaction rate can be obtained by varying the concentration of only one reactant gas species in a gas laser employing two or more reactant gas species. For example, the concentration of molecular fluorine may be varied within a stream of mixed fluorine and hydrogen in the case of an HF laser. For any given laser cavity configuration and associated source of initiation radiation, the requisite profile of reactant gas concentration across the cavity may be calculated by formulating a mathematical model for the absorption of radiation within the cavity and the resulting chemical chain reaction within the cavity. A computer assisted, iterative numerical method may be used to calculate to any desired degree of precision the requisite reactant gas concentration profile across the cavity.

Additionally, the refractive index of the gas stream may be kept constant throughout the reaction zone of the cavity despite the variation in reactant gas concentration by tailoring the introduction of one or more inert diluent gases in much the same manner as the reactant gases are tailored. The gas stream is tailored such that the concentration of the diluent gas varies approximately inversely with the concentration of the reactant gas to thereby compensate for the change in refractive index that would otherwise be caused by varying the concentration of the reactant gas. As a result, laser radiation generated within the reaction zone of the cavity does not undergo refraction away from the optical axis of the laser and is emitted as a highly collimated beam of laser radiation.

DESCRIPTION OF THE PREFERRED EMBODIMENT

In the preferred embodiment of the present invention, a pulsed HF (hydrogen fluoride) laser is initiated by flash photolysis with ultraviolet radiation. A reactant gas stream includes a mixture of he two reactant species, molecular hydrogen ($H_2$) and molecular fluorine ($F_2$), as well as diluent species argon and helium. Additionally, a trace amount of molecular oxygen is included to inhibit premature chemical reaction (and explosion) of the hydrogen/fluorine mixture.

Figure 3:
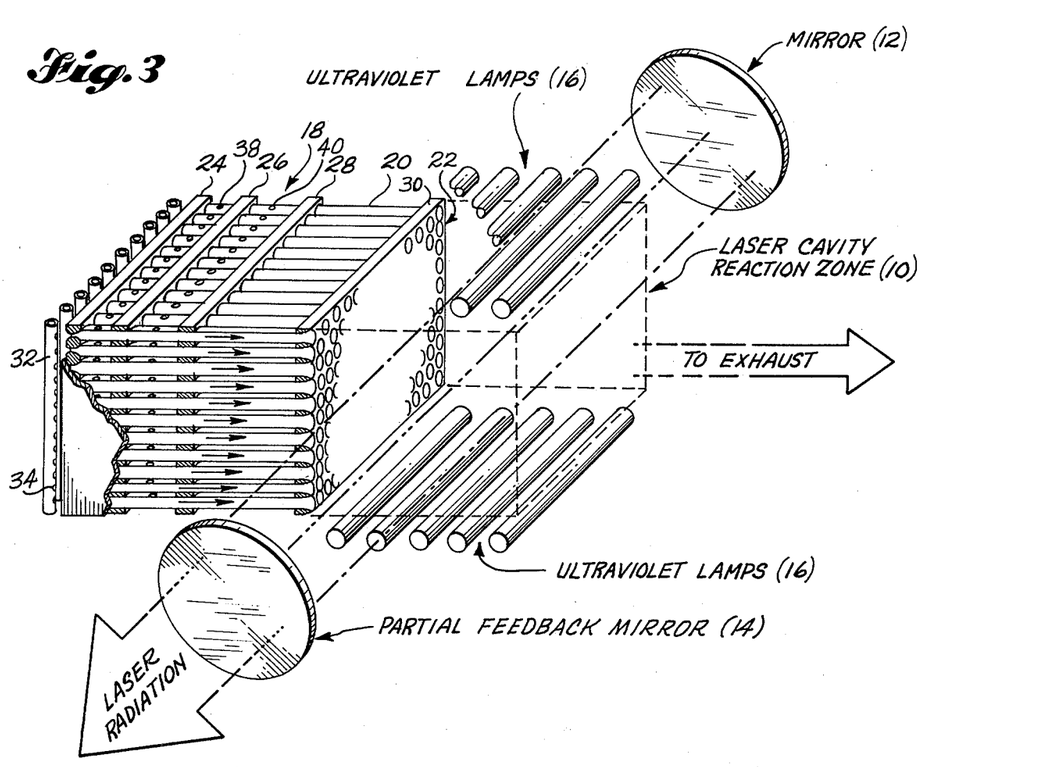
FIG. 3 is a schematic isometric illustration of a chemical gas laser constructed in accordance with the present invention.

A laser constructed in accordance with the present invention is illustrated schematically in FIG. 3. It will be understood that only the essential functional elements are included for the purpose of this illustration. The laser includes a laser cavity having therein a reaction zone 10. A 100% feedback mirror 12 and a partial feedback mirror 14 are positioned in parallel alignment at opposite ends of the cavity along the z-axis of a Cartesian coordinate system centered on the cavity and the reaction zone 10. The optical axis of the laser is thus along the z-axis and passes through the centers of the mirror 12 and the partial feedback mirror 14. In practice, a mirror assembly known in the art as an unstable resonator is typically employed, particularly in the case of a high gain laser, but for the purpose of describing the present invention the details of such a mirror assembly are not essential.

Dual banks of tubular UV flash photolysis lamps 16 are positioned adjacent to the upper and lower boundaries of the reaction zone 10. The axes of the tubular flash lamps 16 are positioned parallel to the z-axis for the purpose of the mathematical model discussed below. UV radiation from the flash lamps 16 is directed primarily inwardly toward the reaction zone 10 by means of reflectors (not shown).

Figure 4:
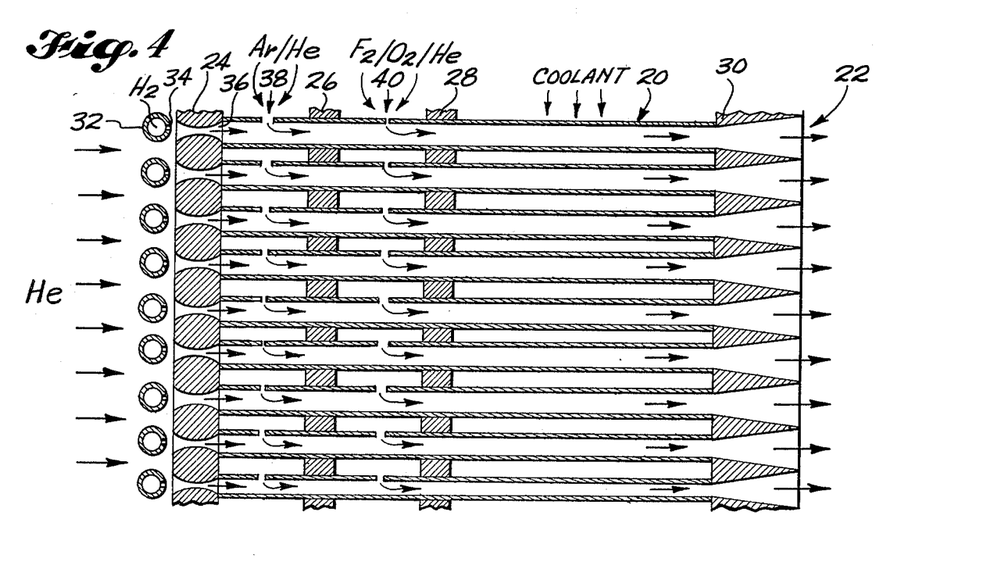
FIG. 4 is a schematic cross-section of the gas injector/mixer manifold of the laser shown in FIG. 3.

The reactant/diluent gas mixture is formed in a gas manifold 18 and passed through the reaction zone 10 along the x-axis to a gas exhaust outlet (not shown). The gas manifold 18 is shown in more detail in FIG. 4. Referring to FIG. 4, the gas manifold 18 includes an array of injector/mixer tubes 20 which terminate at nozzles 22 opening into the reaction zone 10 of the laser cavity. The injector/mixer tubes 20 abut at their ends opposite the nozzles 22 against a rear bulkhead panel 24. The tubes 20 pass through intermediate bulkhead panels 26 and 28 and terminate at a terminal bulkhead panel 30 in which the nozzles 22 are formed.

An array of hydrogen discharge tubes 32 is positioned adjacent the rear bulkhead panel 24. The hydrogen discharge tubes 32 include orifices 34 which are each aligned with a corresponding orifice 36 in the rear bulkhead panel 24 opening into an injector/mixer tube 20. A background flow of diluent helium gas is provided from a source of helium (not shown) upstream of the rear manifold panel 24 and the hydrogen discharge tubes 32. The background source of helium gas provides a constant flow of helium around the hydrogen discharge tubes 32, through the orifices 36 and through the injector/mixer tubes 20. This background flow of helium is substantially identical for each tube 20.

A flow of hydrogen gas is provided by the hydrogen discharge tubes 32. The orifices 34 in the hydrogen discharge tubes 32 are substantially identical and provide an even flow of reactant hydrogen gas through each of the tubes 20. Hydrogen is fed to the array of discharge tubes 32 through a variable speed rotary valve (not shown) which effects a pulsing of the reactant gas stream reaching the reaction zone 10 of the cavity. The rate of pulsing of the hydrogen gas flow is timed to synchronize with the rate of initiation by the flash lamps 16.

The injector/mixer tubes 20 each further include a diluent orifice 38 between manifold panels 24 and 26 and a fluorine orifice 40 between manifold panels 26 and 28. Mixed argon/helium diluent gas is maintained at a moderately high pressure between the bulkhead panels 24 and 26 and is thereby continuously injected through the orifices 38 into the tubes 20. Similarly, fluorine gas with a small amount of intermixed oxygen and helium is maintained under pressure between the bulkhead panels 26 and 28 to be thereby injected into the tubes 20 through the orifices 40.

The sizes of the diluent orifices 38 vary along the y-axis direction, that is from top to bottom in FIG. 4, but are substantially constant from one tube 20 to another in the z-axis direction. The orifices 38 reach a maximum size in the upper and lower rows of tubes 20 and progressively decrease in size toward the center of the array. That is, the sizes of the orifices 38 are varied so as to produce a tailored diluent gas profile across the reaction zone 10 of the laser cavity in the y-axis direction, but yet maintain a substantially constant profile across the reaction zone 10 in the z-axis direction.

Likewise, the fluorine orifices 40 are varied in size from one tube 20 to another in the y-axis direction, but are kept substantially constant between tubes 20 in the z-axis direction. The orifices 40 are largest in the row of tubes 20 at the center of the array and progressively decrease in size toward the upper and lower boundaries of the array. This produces a tailored fluorine profile across the reaction zone 10 in the y-axis direction but not in the z-axis direction. As discussed in greater detail below, the variation in the sizes of the orifices 38 and 40 is approximately inversely related in order to obtain a gas mixture in each injector/mixer tube 20 which has a substantially constant density and index of refraction.

A flow of coolant fluid may be provided between the bulkhead panels 28 and 30 in order to cool the gas mixtures flowing through the tubes 20. Cooling of the reactant gas mixture maintains the temperature of the manifold and the gas stream at a uniform level.

As discussed above, a pulsed HF laser uses the chemical reaction beween hydrogen and fluorine to release chemical energy and create the population inversion of excited product species necessary for lasing. When the hydrogen/fluorine mixture is initiated by a pulse of ultraviolet radiation, a small fraction of the fluorine molecules is dissociated into fluorine atoms according to equation (1) above.

In practice, only a small amount of fluorine need be dissociated to initiate the reaction, typically one-half to one percent of the molecular fluorine present. Upon initiation, the chemical chain reaction between the hydrogen and fluorine proceeds rapidly according to equations (2) and (3) above. Typically, a flash of UV radiation lasting approximately 2 microseconds initiates the reaction. The chemical reaction proceeds to completion over a period of approximately 20 to 30 microseconds. Substantially all laser emission takes place during the first 2 to 4 microseconds of this period. The entire cycle is repeated at a pulse rate of up to 100 pulses per second.

From equations (2) and (3) above, it will be apparent to one skilled in the art that the initial rate of formation (R) of excited HF molecules at any point within the reaction zone can be represented by the following expression:

$$R \; \alpha [F_2] \cdot [F] \qquad (4)$$

where $[F_2]$ and $[F]$ denote the local partial pressures of molecular flourine and atomic flourine, respectively.

Based on the relationship of equation (4) above, two approaches have been used to calculate the concentration profile of molecular fluorine necessary to obtain a uniform initial reaction rate throughout the cavity. The details of these approaches are discussed below. Briefly, in the first approach the fluorine concentration profile is defined by a polynomial equation. In practice, it is found that a quadratic equation having a single variable parameter is sufficient for this purpose. The variable parameter of the quadratic equation is then varied until the resulting fluorine concentration profile provides a relatively constant chemical reaction rate across the cavity, as determined by a radiation absorption model described below. In the second approach, an iterative numerical method is employed wherein the cavity is hypothetically divided into discrete regions of laminar gas flow.

In the first approach, the concentration profile of molecular fluorine along the y-axis is assumed to be defined by a continuous quadratic function represented by the equation:

$$[F_2(y)] = [F_2]_0 \cdot \left[1 + \epsilon - \epsilon \left(\left|\frac{y - y_c}{W_y/2}\right|\right)^2\right] \quad (5)$$

where $[F_2(y)]$ is the partial pressure of $F_2$ as a function of y, $[F_2]_0$ is the partial pressure of molecular fluorine at the edges of the cavity, y is the y-axis coordinate of a field point within the cavity, $y_c$ is the y-axis coordinate at the center of the cavity, $W_y$ is the width of the cavity along the y-axis and $\epsilon$ is the variable parameter in the quadratic function.

Figure 2:
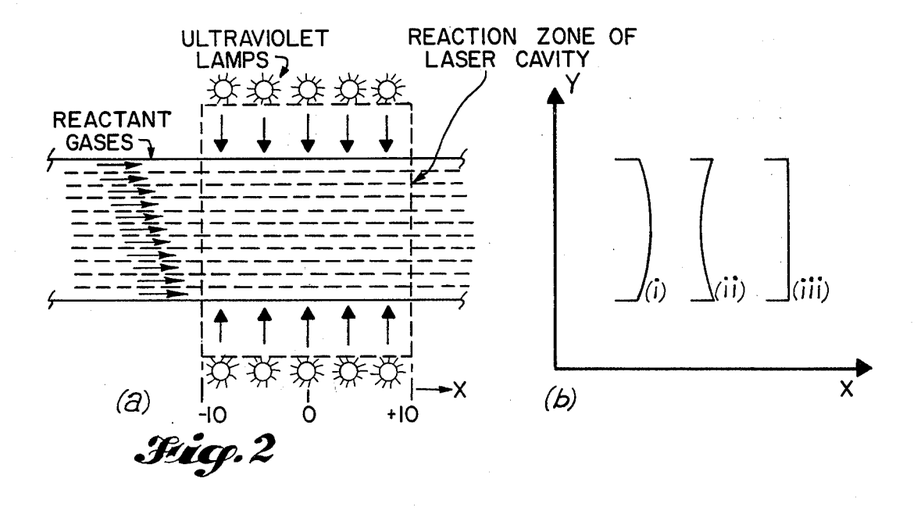
FIG. 2 is a schematic diagram of a chemical gas laser employing the present invention, together with an accompanying graphical illustration of profiles analogous to those of FIG. 1.

In the next step towards determining the requisite concentration profile for fluorine, a mathematical model for UV radiation absorption within the laser cavity is defined. This model must take into account the geometry of the laser cavity, the number and configurations of the UV flash photolysis lamps, and the positions of these lamps with respect to the cavity. This provides the basis for a radiation absorption analysis. For example, the cavity and reaction zone configuration illustrated schematically in FIGS. 1, 2 and 3 may be taken as illustrative of the starting point for a model of the preferred embodiment. In terms of the Cartesian coordinate system superimposed thereon, the reaction zone of the laser cavity has a square cross section extending from $x = -10$ to $x = +10$ along the direction of gas flow. The reaction zone extends from $y = -10$ to $y = +10$ along the y-axis, with the upper and lower sets of UV flash lamps being positioned at $y = -20$ and $y = +20$, respectively. The UV flash lamps are taken to be linear sources of radiation extending in the z-axis direction at the abovementioned y-axis coordinates.

UV radiation emitted from a given flash lamp during photolysis is attenuated as it travels through the cavity. Two types of attenuation take place, namely, a geometric attenuation whereby the UV intensity varies inversely with the distance from its source, and an absorption attenuation which is dependent upon the concentration and type of each gas in the cavity. For the present purposes, it may be assumed that UV absorption due to gaseous species other than $F_2$ is negligible. The attenuation of the initiation radiation may then be represented by the following expression which describes the intensity of radiation from any given lamp $(I_i)$ at any point (x,y) in an x-y plane in the reaction zone:

$$I_i(x,y) \alpha \frac{1}{r_i} \cdot \left(e^{-a(\overline{[F_2]_i})r_i}\right) \quad (6)$$

where $r_i$ is the distance from lamp i to the field point (x,y) in the reaction zone, a is a UV absorption coefficient for molecular fluorine, and $\overline{[F_2]_i}$ is the average partial pressure of $F_2$ along the path between lamp i and the field point (x,y). For the present purposes, $\overline{[F_2]_i}$ is given by the equation:

$$\overline{[F_2]_i} = \frac{\int [F_2(y)] \, dy}{\int dy} \quad (7)$$

where the integrals are calculated over the path of the UV radiation from lamp i to the field point (x,y). The total intensity of UV radiation at any given field point in the reaction zone can then be obtained by summing the contributions from all of the UV flash lamps. Thus, the total intensity, I, of the initiation radiation at a given point in the reaction zone can be represented by the expression:

$$I(x,y) = \sum_{\text{all } i} I_i(x,y) \, \alpha \, \sum_{\text{all } i} \left(\frac{1}{r_i}\right) \cdot \left(e^{-a(\overline{[F_2]_i})r_i}\right) \quad (8)$$

This expression provides a mathematical model of UV attenuation within the reaction zone of the laser cavity.

Having defined a model for UV attenuation within the reaction zone, the fluorine concentration profile that is required to give a substantially uniform initial chemical reaction rate can be determined as follows. First, it is assumed that the initial concentration of atomic fluorine at any point in the reaction zone is proportional to the product of the intensity of the UV radiation at that point and the initial concentration of molecular fluorine at that point. This relationship can be expressed by the following equation:

$$[F(x,y)] \alpha I(x,y) \cdot [F_2(y)] \quad (9)$$

By combining equations (4) and (9), it follows that:

$$R(x,y) \alpha [F_2(y)]^2 \cdot I(x,y) \quad (10)$$

where R(x,y) is the initial chemical reaction rate expressed as a function of the coordinates of the field point. The value of R(x,y) may further be expressed by substituting the expression for I(x,y) from equation (8) and the expression for $[F_2(y)]$ from equation (5) to give the expression:

$$R(x,y) \alpha \left([F_2]_0 \cdot \left[1 + \epsilon - \epsilon \left(\left|\frac{y - y_c}{W_y/2}\right|\right)^2\right]\right)^2 \cdot \left(\sum_{\text{all } i} \left(\frac{1}{r_i}\right) \left(e^{-a(\overline{[F_2]_i})r_i}\right)\right) \quad (11)$$

By appropriate application of back wall reflectors and tilted side wall reflectors, the dependence of R on x in the above equation may be minimized and rendered negligible, leaving R as a function of y only. The value of $\epsilon$ in the above equation is then varied until R(y) is a substantially constant function across the reaction zone in the y-axis direction. This may be done incrementally by well-known iterative root-finding methods. The resulting equation for $[F_2(y)]$ gives a function for R(y) which is constant to within a few percent across the reaction zone in the y-axis direction.

Whereas the above-described approach assumes a continuous fluorine concentration profile across the cavity, as defined by the quadratic function given in equation (5) the second approach is a numerical method in which it is assumed that the reaction zone is divided into an integral number of discrete regions, each region being a well-mixed layer of gas corresponding to the stream of gas from a row of injection/mixer tubes. This second approach permits a more precise formulation of the fluorine concentration profile, at least within the limits imposed by the underlying assumptions regarding the well-mixed and ideally separated layered regions, and also more accurately reflects the actual flow conditions within the cavity.

In the mathematical model of the preferred embodiment illustrated in FIG. 3, the reaction zone is divided into eleven discrete layered regions. The gases in each region are assumed to be well-mixed due to turbulent mixing in the injection/mixer tubes. The regions are further assumed to be perfectly separated from one another at the boundary planes between adjacent regions. Furthermore, the initial rate of chemical reaction and the intensity and absorption of UV radiation are all assumed to be constant within each region.

In the first step of the method, a fixed value, $\overline{[F_2]}_f$, is chosen for the average fluorine concentration within the reaction zone of the cavity. This also fixes the total fluorine content for all eleven regions of the reaction zone. In the steps described below, this fixed value $\overline{[F_2]}_f$ is iteratively compared with a calculated value of the average fluorine concentration, $\overline{[F_2]}$, which is based on an $F_2$ profile chosen for the cavity. Whereas in the previously described method the calculated value of $\overline{[F_2]}$ was represented by equation (7), in the discrete region model the calculated value of $\overline{[F_2]}$ is represented by the equation:

$$\overline{[F_2]} = \left(\frac{1}{11}\right) \sum_{j=1}^{11} [F_2]_j \qquad (12)$$

where $[F_2]_j$ is the concentration of $F_2$ in region $j$ (expressed as partial pressure in units of torr).

In the next step, an arbitrary value of $[F_2]_1$ is chosen for the first region (j=1) of the reaction zone. This value is typically initially set equal to the average value chosen for the entire reaction zone, $\overline{[F_2]}_f$, as an initial approximation. The UV intensity is then calculated for the first region using the equation:

$$I_1 \alpha \sum_{\text{all } i} \left(\frac{1}{r_i}\right) \left(e^{-a(\overline{[F_2]i}) h_i}\right) \qquad (13)$$

The initial chemical rection rate for the first region, $R_1$, is then calculated according to the following expression, which is strictly analogous in derivation to equation (10):

$$R_1 \alpha ([F_2]_1)^2 \cdot I_1 \qquad (14)$$

Having calculated $R_1$ for the first region, the second region is held to have the same initial chemical reaction rate. The requisite value of $[F_2]_2$ necessary to give this rate is calculated accordingly. Standard root finder techniques are applied to find that value of $[F_2]_2$ for which the following equality obtains:

$$[F_2]_2{}^2 \cdot I_2 = [F_2]_1{}^2 \cdot I_1 \qquad (15)$$

This procedure is sequentially repeated until the center region of the reaction zone (j=6) is reached, it being unnecessary to go further because the fluorine profile is necessarily symmetric about the center. At this point a new value of $\overline{[F_2]}$ is calculated, using equation (12) together with the newly calculated values of $[F_2]_j$ for each region. The new value of $\overline{[F_2]}$ is then compared with the originally chosen, fixed value, $\overline{[F_2]}_f$. Depending on the extent of the difference between the two values, the process is repeated, each time using a new assumed starting value of $[F_2]_1$, until the fixed value $\overline{[F_2]}_f$ and the newly calculated value of $\overline{[F_2]}$ converge.

Further refinements may be added to both the model for the physical configuration of the laser and the numerical process for determining the optimum $F_2$ profile. For example, end reflectors may be added to the UV lamps. These compensate for the fact that the above-described methods for determining the optimum $F_2$ profile can only be strictly applicable to a single y-z plane through the reaction zone. Because there is some variation in UV intensity in the cavity along the x-axis, there can only be one plane perpendicular to the x-axis in which the initial chemical reaction rate can be made constant. The use of end reflectors minimizes this problem. In more refined calculations of the UV intensity, the angle and dimension of each such reflector are considered, as well as their surface reflectivity.

Also, each UV radiation source may further be assumed to be a planar Lambertian emitter, i.e., wherein the intensity at a given distance from each light source varies as a function of the cosine of the angle of radiation emission with respect to the y-axis.

As an example, when the above refinements are considered for a laser having the configuration shown in FIG. 3, and where an initial average fluorine partial pressure was chosen to be 200 torr, the following $F_2$ profile for the eleven regions of the reaction zone was obtained:

| Region | [F₂] (torr) |
|--------|-------------|
| 1      | 173.1       |
| 2      | 185.6       |
| 3      | 197.5       |
| 4      | 207.7       |
| 5      | 214.6       |
| 6      | 217.1       |
| 7      | 214.6       |
| 8      | 207.7       |
| 9      | 197.5       |
| 10     | 185.6       |
| 11     | 173.1       |

Having determined the requisite $F_2$ profile that results in a constant initial chemical reaction rate across the cavity by the methods described above, there is determined by the methods described below the requisite diluent gas profile that gives both a constant density ($\rho$) as well as a constant index of refraction (n) across the cavity in the y-axis direction. It is desired to provide a constant gas density across the cavity in order to have a constant gas flow velocity across the cavity. As mentioned earlier, it is further desired to have a constant index of refraction across the cavity in order to avoid refraction of radiation within the cavity. Once the requisite diluent gas profile is determined, the diluent gas mixture in the gas stream flowing through the cavity may be tailored accordingly by use of the gas manifold 18 described above or by other suitable methods which may be apparent to one skilled in the art.

The index of refraction of the gas mixture at any point is related to the density ($\rho$) and the modified Gladstone-Dale constant ($\beta$) of the gas by the equation:

$$n = 1 + \beta\left(\frac{\rho}{\rho_r}\right) \quad (16)$$

where $\rho_r$ is a reference density for the gas. Thus, the diluent gas profile must be varied to provide a constant value of the arithmetic product $$\beta\left(\frac{\rho}{\rho_r}\right)$$

across the cavity.

At the temperatures and pressures employed in pulsed chemical lasers, the gases may be considered to behave ideally according to the equation:

$$\rho = \frac{PW}{RT} \quad (17)$$

where $\rho$ is the density in grams per liter, P is the local pressure, R is the gas constant, T is the absolute temperature in degrees Kelvin, and W is the molecular weight of the local gas mixture, as given by the equation:

$$W = \sum_{\text{all } k} x_k W_k \quad (18)$$

where $x_k$ and $W_k$ are the mole fraction and molecular weight, respectively, of gas species k. Generally, T will be constant throughout the cavity. The local pressure (P) will also be constant throughout the cavity, since it is determined by ambient conditions in the cavity. The molecular weight of fluorine ($F_2$) and argon (Ar) are approximately the same, with the result that argon can be effectively substituted for fluorine on a one-for-one basis to result in a gas density profile across the reaction zone that is substantially constant.

Providing a gas flow in which the index of refraction (n) is also constant across the reaction zone requires additionally that the Gladstone-Dale constant for the gas mixture be constant across the reaction zone. The Gladstone-Dale constant for the gas mixture is given by the equation:

$$\beta = \sum_{\text{all } k} \beta_k x_k \quad (19)$$

where $\beta_k$ is the Gladstone-Dale constant for each gaseous species k. Achieving a gas flow which has both a constant density and a constant index of refraction across the reaction zone can be accomplished by employing a mixture of two or more inert diluent gases, for example argon and helium, and solving equations (18) and (19) simultaneously to determine those combinations of diluent gases which satisfy both equations.

Although the present invention is described and illustrated herein by reference to a preferred embodiment, it will be understood that various modifications, substitutions and alterations which may be apparent to one skilled in the art may be made without departing from the spirit of the invention. Accordingly, the scope of the present invention is defined by the following claims.

The embodiments of the invention in which an exclusive property or privilege is claimed are defined as follows:

1. A method of providing a uniform initial chemical reaction rate in a chemical gas laser wherein a chemical reaction between gaseous reactant species produces excited reaction product species, said laser including a resonant laser cavity and an external source of radiation for initiating said reaction in said cavity by irradiating said gaseous reactant species in a direction of irradiation transverse to the axis of laser emission of said laser, comprising:

forming a stream of said gaseous reactant species flowing through said cavity in a direction substantially transverse to said axis of laser emission;

varying the concentration of at least one of said gaseous reactant species across said cavity in a direction transverse to the direction of flow of said stream and parallel to the direction of irradiation of said external source of radiation, thereby compensating for attenuation of said radiation within said stream to provide a substantially uniform initial chemical reaction rate within said stream.

2. The method defined in claim 1 wherein said chemical reaction is between a pair of gaseous reactant species.

3. The method defined in claim 2 wherein said gaseous reactant species are molecular hydrogen and molecular fluorine.

4. The method defined in claim 2 wherein said gaseous reactant species are molecular deuterium and molecular fluorine.

5. The methods defined in claims 1, 2, 3 or 4 wherein said stream includes at least one species of an inert diluent gas and wherein the concentration of said diluent gas in said stream is varied across said cavity in a direction substantially parallel to the direction of variation in concentration of said reactant gas to thereby provide a substantially uniform index of refraction across said cavity.

6. In a chemical gas laser wherein a stream of reactant gas is caused to flow through a resonant laser cavity in a direction transverse to the optical axis of the laser, and wherein a chemical reaction within said stream of reactant gas is initiated by irradiation of said stream of gas in a direction transverse to the optical axis by an external source of radiation as said gas passes through said cavity, the method of producing a uniform initial chemical reaction rate within said stream of gas passing through said cavity comprising:

providing an array of gas nozzles in a configuration whereby gas projected from said nozzles flows through said laser cavity in a direction transverse to the optical axis of the laser, the direction of gas flow further being substantially transverse to the direction of irradiation from said external source of radiation;

forming a stream of reactant gas through said cavity by means of said nozzles; and, varying the rates of discharge of said reactant gas from said nozzles along a direction of variation substantially parallel to the direction of irradiation from said external source of radiation, to thereby produce within a reaction zone in said cavity a uniform initial chemical reaction rate within said stream of gas.

7. The method of claim 6 wherein said stream of reactant gas includes an inert diluent gas comprising the additional step of varying the rates of discharge of said diluent gas from said nozzles in a direction parallel to the direction of variation of the rates of discharge of said reactant gas to thereby maintain a substantially uniform index of refraction within said stream of gas passing through said reaction zone of said laser cavity.

8. A method of producing a uniform initial chemical reaction rate in a chemical gas laser wherein a chemical chain reaction between molecular hydrogen and molecular fluorine in a resonant laser cavity forms a population inversion of excited gaseous hydrogen fluoride molecules, and wherein said chemical reaction is initiated by dissociation of fluorine molecules to free fluorine atoms by irradiation along a direction of irradiation from an external source of ultraviolet radiation, comprising:

providing an array of gas nozzles in a configuration whereby gas projected from said nozzles flows through said resonant laser cavity in a direction transverse to the axis of laser light emission, said direction of gas flow further being substantially transverse to said direction of irradiation from said external source of ultraviolet light;

forming a stream of gas through said cavity from said nozzles; said gas comprising a mixture of said molecular hydrogen and molecular fluorine species and gaseous diluent species; and, varying the concentration of molecular fluorine projected from said nozzles to thereby produce a uniform rate of initiation of said chemical reaction across said cavity.

9. In a chemical gas laser wherein a stream of reactant gas is caused to flow through a resonant laser cavity in a direction transverse to the optical axis of laser radiation emission of said laser and wherein a chemical reaction is initiated in said reactant gas as it passes through a reaction zone of said laser cavity by irradiating said gas in a direction transverse to both the direction of flow of said stream of reactant gas and the optical axis of said laser, the improvement comprising a means for varying the concentration of said reactant gas across said stream of reactant gas in a direction transverse to the optical axis and transverse to the direction of flow of said stream of gas to thereby produce a uniform initial chemical reaction rate throughout said reaction zone of said cavity upon irradiation of said reactant gas in said cavity.

10. The improvement defined in claim 9 further including the improvement comprising providing an inert diluent gas intermixed with said reactang gas, and means for varying the concentration of said diluent gas in said stream across said cavity in a direction transverse to said optical axis and transverse to the direction of gas flow through said cavity to thereby provide a uniform index of refraction throughout the effective reaction zone of said laser cavity.

11. A chemical gas laser comprising:

means forming a laser cavity having a 100% feedback mirror at one end thereof and a partial feedback mirror at the opposite end thereof, said mirrors defining an optical axis of said laser perpendicular to said mirrors;

means for causing a stream of a reactant gas to flow through said cavity in a direction transverse to said optical axis of said laser;

a source of radiation for initiating a chemical reaction in said stream of reactant gas as said stream flows through a reaction zone in said cavity between said mirrors, said source of radiation operating to irradiate said reactant gas in said reaction zone in a direction transverse to the direction of flow of said stream of reactant gas; and means for varying the concentration of said reactant gas in said stream of reactant gas in a direction substantially parallel to the direction of irradiation from said source of radiation to thereby cause a substantially uniform initial chemical reaction rate to occur in said reaction zone of said cavity upon irradiation of said reactant gas by said source of radiation.

12. The chemical gas laser defined in claim 11 wherein said source of radiation further operates to irradiate said reactant gas in a direction transverse to said optical axis of said laser.

13. The chemical gas laser defined in claim 12 wherein said stream of reactant gas further includes an inert diluent gas, and wherein said laser further comprises means for varying the concentration of said diluent gas within said stream in a direction substantially parallel to the direction of irradiation from said source of radiation to thereby produce a substantially uniform index of refraction within said stream of reactant gas passing through said reaction zone of said cavity.

14. The chemical gas laser defined in claims 12 or 13 wherein said reactant gas includes molecular fluorine and molecular hydrogen.

15. The chemical gas laser defined in claims 12 or 13 wherein said reactant gas includes molecular fluorine and molecular deuterium.

* * * * *